(12) United States Patent  (10) Patent No.: US 8,177,969 B2
Wawrla  (45) Date of Patent: May 15, 2012

(54) FILTER CARTRIDGE FOR USE IN A WATER STORAGE TANK

(75) Inventor: Andreas Wawrla, Widnau (CH)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 724 days.

(21) Appl. No.: 12/223,971

(22) PCT Filed: Feb. 13, 2007

(86) PCT No.: PCT/EP2007/001197
§ 371 (c)(1),
(2), (4) Date: Aug. 14, 2008

(87) PCT Pub. No.: WO2007/093352
PCT Pub. Date: Aug. 23, 2007

(65) Prior Publication Data
US 2009/0032453 A1  Feb. 5, 2009

(30) Foreign Application Priority Data
Feb. 14, 2006 (DE) .......................... 10 2006 047 096

(51) Int. Cl.
*B01D 24/12* (2006.01)
*B01D 35/027* (2006.01)
(52) U.S. Cl. ..................... 210/172.3; 210/282; 210/287; 210/416.3; 210/443

(58) Field of Classification Search .............. 210/172.2, 210/172.3, 282, 287, 288, 416.3, 439, 443
See application file for complete search history.

(56) References Cited

U.S. PATENT DOCUMENTS

| | | | | | |
|---|---|---|---|---|---|
| 2,358,748 | A | * | 9/1944 | Thompson | 210/172.3 |
| 3,633,755 | A | * | 1/1972 | Chaneton | 210/439 |
| 4,242,201 | A | * | 12/1980 | Stephens et al. | 210/240 |
| 4,842,724 | A | * | 6/1989 | Bray et al. | 210/104 |
| 6,383,375 | B1 | * | 5/2002 | Zucholl | 210/172.2 |
| 2005/0011824 | A1 | * | 1/2005 | Vetterli | 210/282 |

FOREIGN PATENT DOCUMENTS

| | | |
|---|---|---|
| DE | 42 00 566 A1 | 1/1992 |
| DE | 197 17 054 A1 | 4/1997 |
| DE | 198 27 623 A1 | 6/1998 |
| EP | 1 498 060 A1 | 6/2004 |
| WO | WO92/16136 | 2/1992 |
| WO | WO 2005/028073 | 3/2005 |
| WO | WO 2006/040120 | 4/2006 |

* cited by examiner

*Primary Examiner* — Matthew Savage
(74) *Attorney, Agent, or Firm* — Breneman & Georges

(57) ABSTRACT

The present invention relates to a filter cartridge for insertion into a water supply tank of a beverage dispenser, such as an espresso machine or the like, in which filter bed formed from filter material is arranged, wherein a connection to the outlet of the filter cartridge is provided to a connector element of the water tank. The invention is characterized in that in the filter bed (4) at least one region is provided through which flow passes from top to bottom.

7 Claims, 1 Drawing Sheet

FILTER CARTRIDGE FOR USE IN A WATER STORAGE TANK

Figure 1:
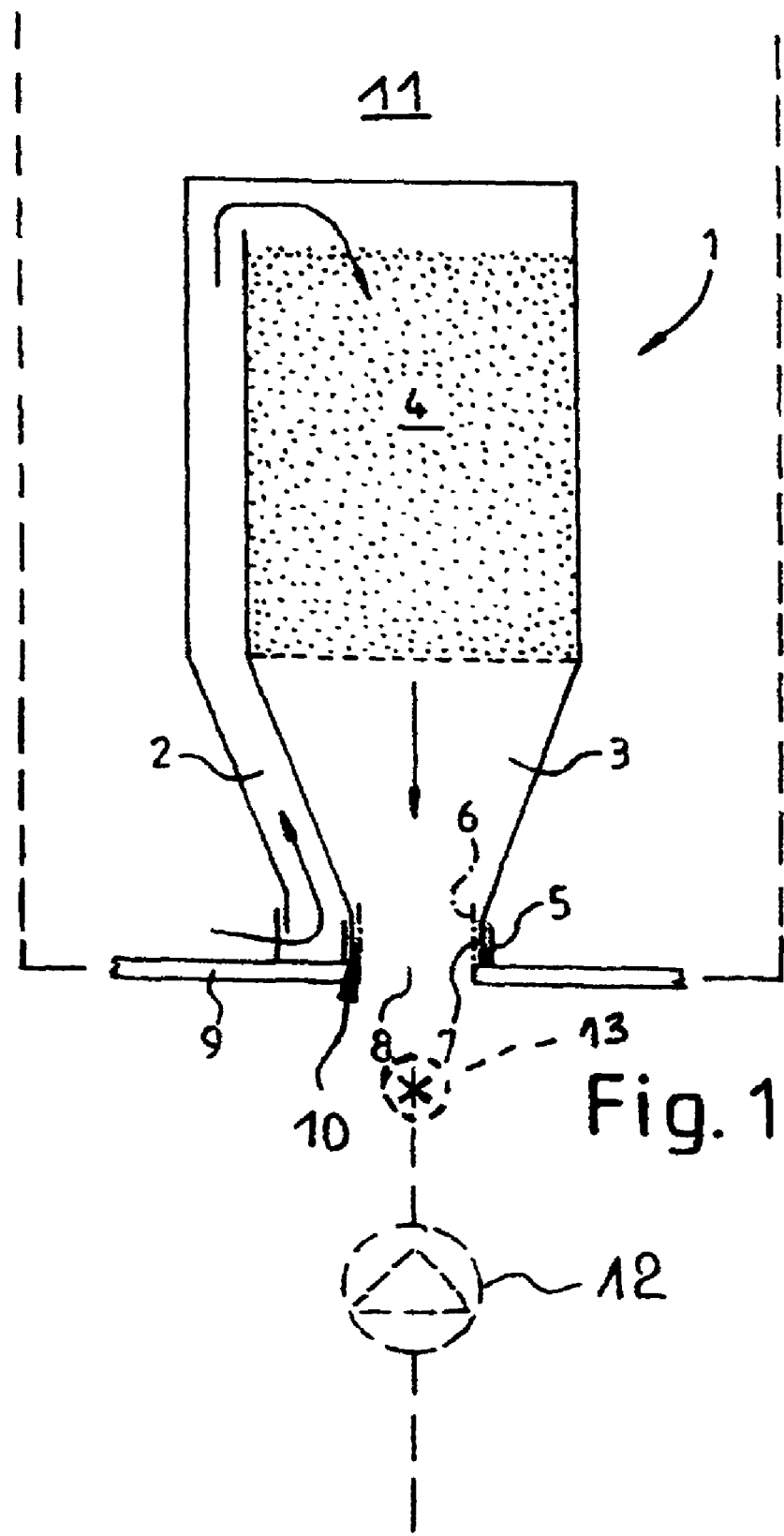

BACKGROUND OF THE INVENTION (1) Field of the Invention

The invention relates to a filter cartridge and beverage machines having a filter cartridge such as an espresso machine or the like having a housing in which a filter bed made of filter material is arranged having a connector element to connect the outlet of the filter cartridge to a connector element of a water storage tank.

(2) Description of Related Art Including Information Disclosed Under 37 C.F.R. 1.97 and 1.98

Filter cartridges for use in a water storage tank of a beverage machine, such as an espresso machine or the like, are generally equipped with a housing in which a filter bed formed from filter material is arranged. Such filter cartridges are, for example, disclosed in patent DE 197 17 054.

In these known filter cartridges the filter bed is subjected to upward flow from bottom to top. This has the consequence that the water must be lifted by a suction pump in the respective beverage machine through the entire filter cartridge against the flow resistance of the filter bed. This flow is opposed both by the resistance of the filter bed, as well as the weight of the water.

BRIEF SUMMARY OF THE INVENTION

The object of the invention is thus to provide a filter cartridge in which the flow path is facilitated. This objective is achieved based on a filter cartridge for insertion into a water storage tank of a beverage machine such as an espresso machine or the like, having a housing in which a filter bed made of a filter material is arranged, wherein a connector element is provided to connect the outlet of the filter cartridge to a connector element of the water storage tank characterized in that in the filter bed at least one region is provided through which flow passes from the top to bottom.

Advantageous embodiments and improvements of the invention are enabled by having an ascending pipeline connected with the water supply tank for receiving water from the water supply tank and conveying it into the filter cartridge, by having a filter cartridge that includes an ascending pipeline that opens into the filter cartridge above the filter bed, by having a filter cartridge with a seal for assuring the tight closure of an outlet aperture with the connector element of the water supply, by having the seal formed as an axial seal for the tight closure with the bottom of the container, by having a connector element for connecting a filter cartridge, providing a water supply tank with a connector element for connecting with a filter cartridge and having a suction pump for sucking water out of the water supply tank through the filter cartridge.

Accordingly, a filter cartridge according to the invention is characterized in that at least one region is provided through which flow passes from top to bottom. In these regions the filter bed can thus support flow that is aided by gravitation, so that the flow resistance of the filter bed is at least partially compensated.

In a particular embodiment of the invention, the filter cartridge includes an ascending pipe connected with the water supply tank for receiving the water from the water supply tank and conveying it into the filter cartridge.

One such filter cartridge assures the water supply into the filter cartridge. In this manner a separate water inlet aperture arranged to be appropriately deep is not necessary with the filter cartridge. Furthermore, this provides the ability to empty the water storage tank to the height of the water inlet aperture.

The filter cartridge advantageously includes an ascending pipeline that opens into the filter cartridge above the filter bed. In this design, flow through the entire filter bed is achieved by the so called downstream method from top to bottom, i.e., the entire filter bed flow occurs with the aid of gravitation.

The ascending pipeline opening into the filter cartridge above the filter bed can thereby be integrated into the filter cartridge, or into its housing, so that it takes place completely inside the cartridge, or it can be placed outside the cartridge in the form of a separate pipe.

The filter cartridge is preferentially provided with a seal, which assures tight closure of the outlet aperture at or in the connector element of the water supply tank. Such a tight seal assures that only filtered water reaches the outlet aperture of the water supply tank, and prevents unfiltered water from mixing with it.

Such a seal is formed advantageously by means of an axial seal for the tight closure of the outlet line at the bottom of the container. Such an axial seal simplifies handling since the necessary tight positive fit is achieved by axial pressing the seal on the bottom of the container. Frictional forces, which can occur, for example, by pressing a radial seal on a suitably formed radial sealing seat, are hereby avoided.

Furthermore, a defined operating position is achieved in a problem free manner with the aid of an axial seal, provided with the help of a stop.

A filter cartridge according to the invention is preferably used in a water supply tank with a check valve, so that the water supply tank can be removed from the corresponding drink dispenser without water being able to pour out of its base aperture. The water supply tank can thereby be removed from the machine for filling.

The corresponding beverage dispenser is furthermore advantageously provided with a suction pump in order to assure reliable flow through the filter cartridge, and thus reliable removal of the desired amount of water for the beverage dispenser.

In the case of flow through the filter bed in the downward direction, the flow resistance of the filter bed is at least partially compensated for by gravitation, as has been stated above, so that the suction pump can be sized smaller.

BRIEF DESCRIPTION OF THE SEVERAL VIEWS OF THE DRAWING(S)

An embodiment of the invention is shown in the drawing, and will be described in greater detail in the following sections.

In particular,

FIG. 1 is a schematic sectional representation of an embodiment of the invention.

DETAILED DESCRIPTION OF THE INVENTION INCLUDING BEST MODE

In a filter cartridge 1 according to FIG. 1, the ascending pipeline 2 is arranged laterally alongside the outlet pipe 3. The water reaches the filter bed 4 from above through the ascending pipeline, which has the consequence that the flow in the filter bed takes place exclusively in the downward direction. In this embodiment, for example, an outer enclosed connector socket 5 is optionally provided. Alternatively, or in combination with this, a connector socket 6 projecting toward the interior inside the outlet pipe can also be provided. By means of a sealing element 7, which can, for example, be designed as an axial seal the outlet pipe 3 is sealed with respect to the external environment, so that only filtered water can reach the outlet aperture 8 on the tank bottom 9 of the tank 11. An optional suction pump 12 is provided to assure a reliable flow through the filter cartridge 1 to provide a reliable removal of a desired amount of water for a beverage dispenser. Preferably a check valve 13 is also provided so that tank 11 can be removed without having water pour out of the outlet aperture 8. As shown in FIG. 1, the filter cartridge includes a housing surrounding a vertical axis in which a filter bed made of a filter material is arranged, the housing having an outlet pipe surrounding the vertical axis connected to the bottom of the housing received in and/or on an outlet connector element 5, 6 on a bottom 9 of the water supply tank 11. The filter cartridge includes a flow region within the housing and above the filter bed which excludes any filter material. An ascending pipeline 2 is located laterally alongside an outside of the housing and the outlet pipe. The ascending pipeline has an inlet end that is located proximate to an outlet end of the outlet pipe received in an inlet element on the bottom of the water supply tank proximate the outlet connector element. The ascending pipeline also includes an outlet end having an opening into the flow region, wherein the ascending pipeline extends upwardly from the inlet end to the outlet end and excludes any filter media. As shown in the Figure, water flows from an interior of the water supply tank into the inlet element, then from the inlet element into the inlet end of the ascending pipeline at the bottom of the water supply tank, then upwardly from the inlet end to the outlet end of the ascending pipeline and into the flow region, then downwardly from the flow region through the filter bed, then downwardly from the filter bed and out of the outlet end of the outlet pipe, and then downwardly from the outlet pipe into the outlet connector element on the bottom of the water supply tank to exit the water supply tank.

REFERENCE LIST

1 filler cartridge
2 ascending pipeline
3 outlet pipe
4 filter bed
5 connector socket
6 connector socket
7 sealing element
8 outlet aperture
9 tank bottom

What is claimed is:

1. A combination of a filter cartridge and a water supply tank comprising: a housing surrounding a vertical axis in which a filter bed made of a filter material is arranged, the housing having an outlet pipe surrounding the vertical axis connected to the bottom of the housing received in and/or on an outlet tank connector element on a bottom of the water supply tank, a flow region within the housing and above the filter bed which excludes any filter material, an ascending pipeline located laterally alongside an outside of the housing and the outlet pipe, the ascending pipeline having an inlet end that is located proximate to an outlet end of the outlet pipe and is received in an inlet element on the bottom of the water supply tank proximate the outlet connector element, wherein the ascending pipeline includes an outlet end having an opening into the flow region, wherein the ascending pipeline extends upwardly from the inlet end to the outlet end and excludes any filter material, whereby water flows from an interior of the water supply tank into the inlet element, then from the inlet element into the inlet end of the ascending pipeline at the bottom of the water supply tank, then upwardly from the inlet end to the outlet end of the ascending pipeline and into the flow region, then downwardly from the flow region through the filter bed, then downwardly from the filter bed and out of the outlet end of the outlet pipe, and then downwardly from the outlet pipe into the outlet connector element on the bottom of the water supply tank to exit the water supply tank.

2. The combination according to claim 1 wherein the inlet end of the ascending pipeline is provided at a close offset distance to the outlet pipe of the housing.

3. The combination according to claim 1 wherein the ascending pipeline opens into the housing above the filter material.

4. The combination according to claim 1 or 3 wherein the outlet pipe has an axial seal (7).

5. The combination according to claim 1 further comprising an axial seal (7) on the outlet pipe.

6. The combination according to claim 1 wherein the outlet connector element is connected to an outlet aperture in the bottom of the water supply tank.

7. The combination according to claim 6 further comprising a suction pump for sucking water out of the outlet aperture of the water supply tank through the filter cartridge.

* * * * *